Jan. 3, 1956   J. P. JONES   2,729,199
TREE SHAKERS
Filed Sept. 17, 1951   2 Sheets-Sheet 1
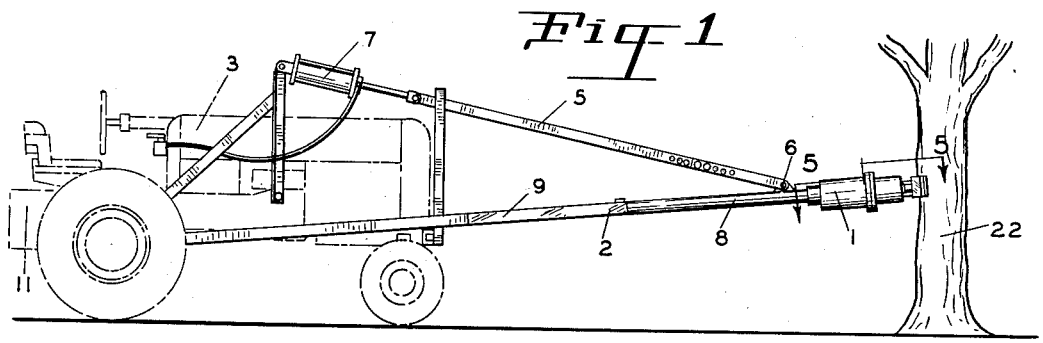
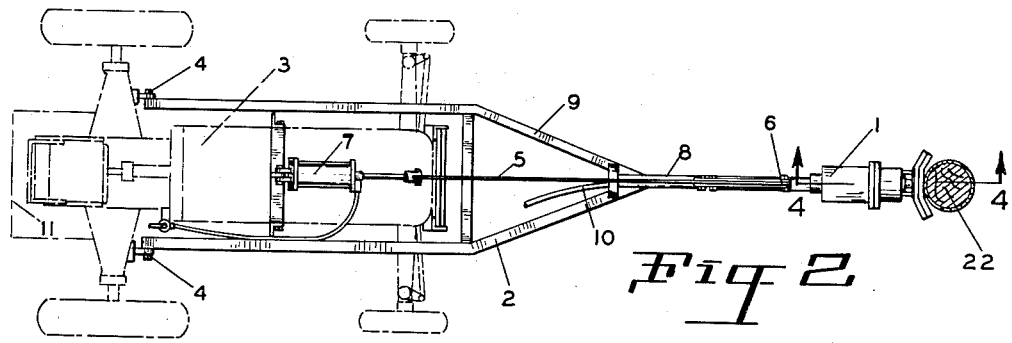
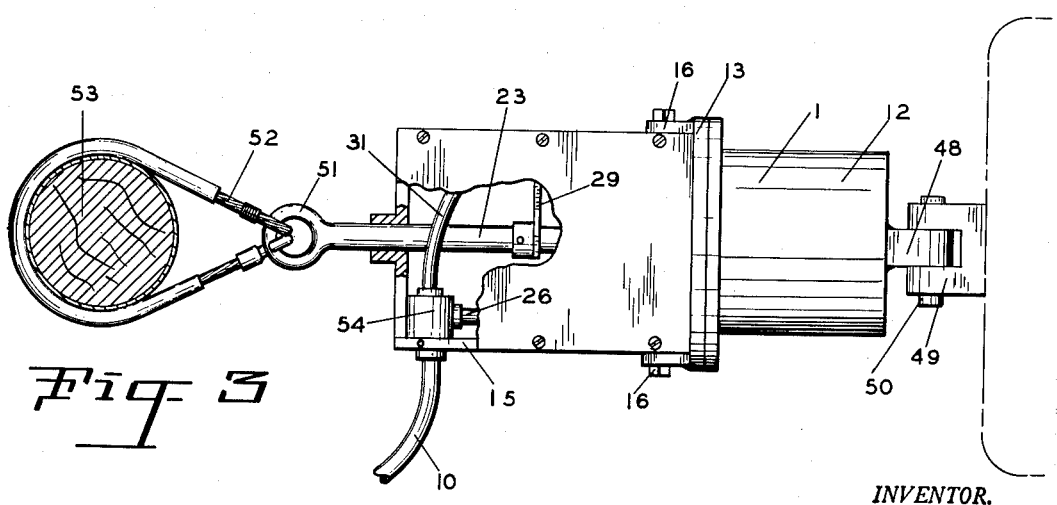
INVENTOR.
JOHN P. JONES
BY
ATTORNEY

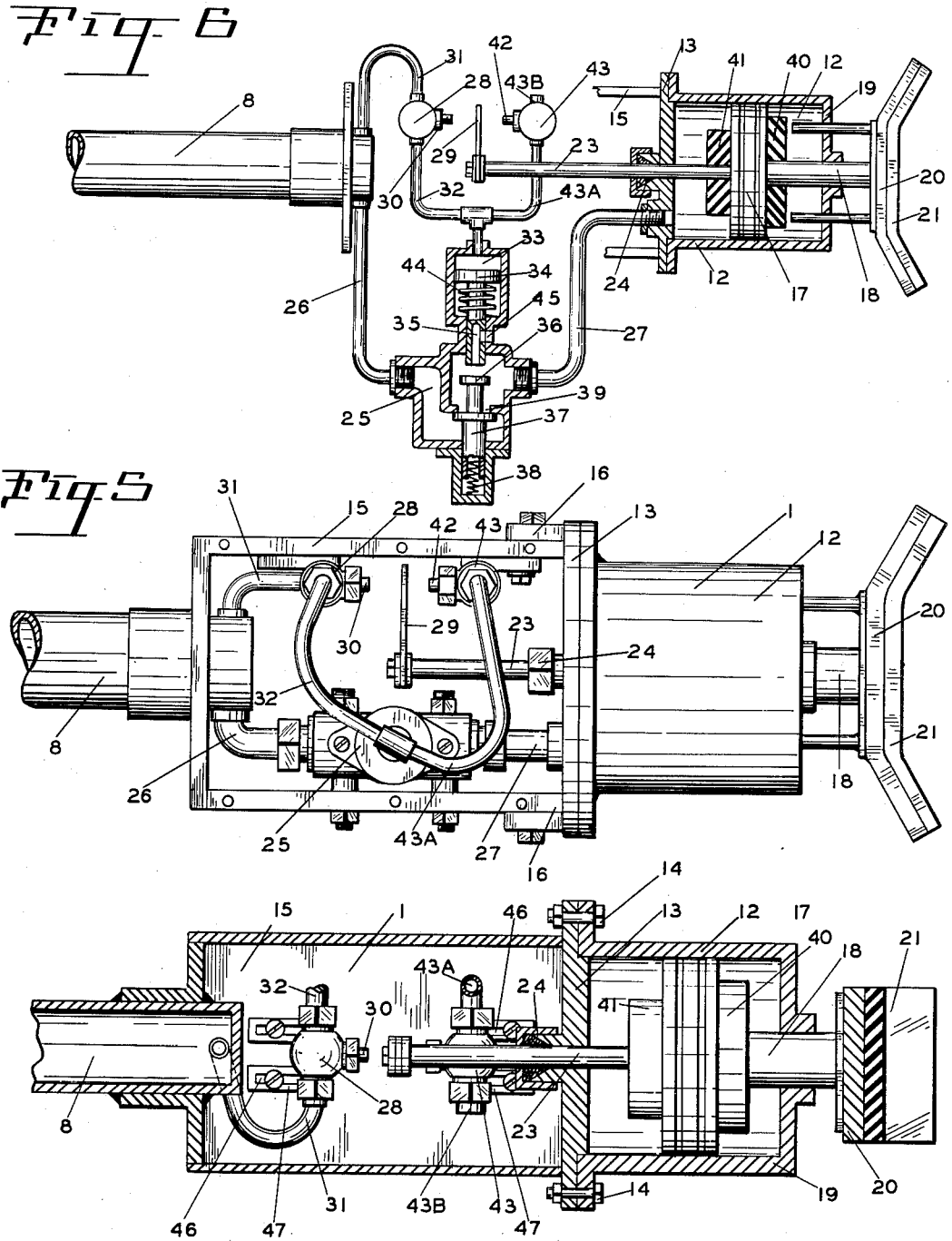

United States Patent Office 2,729,199
Patented Jan. 3, 1956

2,729,199

TREE SHAKERS

John P. Jones, Portland, Oreg.

Application September 17, 1951, Serial No. 246,943

2 Claims. (Cl. 121—157)

This invention relates to shakers or vibrators and is particularly adapted for the shaking of trees for removing nuts or fruit therefrom.

The primary object of the invention is to design a shaking device to be attached to tractors that will shake a tree when the device is brought against the same, and in the shaking of the tree the contact pad of the vibrator will remain in contact with the tree at all times when the shaker is shaking the tree.

A further object of the invention is that the shaker will be inactive until brought in contact with the tree, the contacting of the tree setting the shaker into operation.

A still further object of the invention is that the number of vibrations per minute will be determined by the pressure applied to the tree by the push of the tractor and the shaker.

Another object of the invention is the controlling of the vigor of vibration by high or low air operating pressures.

These and other incidental objects will be apparent in the drawings, specification and claims.

Referring to the drawings:

Figure 1 is a side view of my new and improved tree shaker showing the tractor by broken lines.

Figure 2 is a plan view of Figure 1.

Figure 3 is another preferred way of using my new and improved tree shaker wherein the same is shown exerting a pull on the tree instead of a push.

Figure 4 is an enlarged detail side sectional view of the shaker, taken on line 4—4 of Figure 2, the tree trunk being omitted.

Figure 5 is a plan, partially in section, view taken on line 5—5 of Figure 1 with the tree trunk omitted.

Figure 6 is a sectional diagrammatical layout of the pneumatic shaking system employed for shaking the tree.

Referring more specifically to the drawings:

My new and improved tree shaker consists of a shaker head 1 supported by a boom 2. The said boom is pivotally connected to the tractor 3 at any suitable location, as for instance at 4. The boom is supported by the raising or lowering link 5, which is pivotally connected to the boom at 6 and to the hydraulic cylinder at 7. By operating the hydraulic cylinder the boom can be either raised or lowered as desired in the usual manner.

The boom consists of a section of tubing 8, which is secured to an A-frame 9 by any suitable means, as for instance welding. The said A-frame embracing the tractor as best illustrated in Figure 2. The tubular member 8 provides a reservoir for air supplied by the tubing 10 from the air pumping unit 11.

I will now describe in detail the operation of the shaker head 1. This head consists of a cylinder 12, having a cylinder head 13 secured thereto in the usual manner, as by bolts 14. The cylinder 12 is connected to the tubular member 8 of the supporting boom by the U-shaped frame 15, which is bolted to the lugs 16, which are formed integral with the cylinder head 13. A piston 17 operates within the cylinder 12.

In the pusher type shaker as illustrated in the drawings, except that shown in Figure 3, a piston rod 18 extends through the cylinder head 19, terminating in its outer end in a pusher bar 20. The bar 20 has a resilient pusher pad 21 fixedly secured therein for contacting the trunk of the tree 22.

Extending from the opposite side of the piston 17 is a valve operating rod 23, which passes through the stuffing box 24 of the cylinder head 13. The operation of which will be described later. A main valve 25 is bolted to the frame 15 as best illustrated in Figure 5, and is adapted to admit air from the reservoir 8 through the pipe connection 26 and pipe connection 27 into the cylinder 12 when operated by the two-way pilot valve 28 in the following manner.

When it is desired to shake the tree 22, the tractor 3 and the boom 2, including the shaker head 1, are moved towards the tree, the pusher bar 20 contacts the tree and the tractor is moved forward exerting a pressure against the tree. This moves the piston 17 to the left as viewing the drawings, which pushes the valve operating rod 23 also to the left, moving the arm 29 towards the push button 30 of the two-way pilot valve 28. This opens the said valve, admitting air from the reservoir 8 through the piping 31, valve 28, pipe 32 into the cylinder 33 of the main valve, which forces the piston 34 downwardly carrying the hollow stem 35 therewith which contacts the plunger 36 of the valve 37 pushing the same down against the spring 38 and opening the valve port 39.

This admits air from the reservoir 8 through the pipe 26 into the main valve 25, through the port 39, through the pipe 27, into the cylinder 12, which forces the piston 17 to the right as viewed in the drawings, which will push the tree 22 away from the tractor. Flexible bumpers 40 and 41 are secured to either side of the piston 17. This arrests the movement of the piston reducing the shock.

When the piston has reached its full travel to the right, the valve operating arm 29 contacts the push button 42 of the two-way pilot valve 43. This momentarily opens this valve allowing the air to escape from the cylinder 33 of the main valve 25 by way of the pipe 43A through the valve 43 to the atmosphere by way of the exhaust port 43B. This permits the piston 34 to raise by the action of the spring 44 allowing the valve 37 to raise by the action of the spring 38, closing the valve port 39, arresting the flow of air into the cylinder 12 through the main valve. At the same time the air from the cylinder 12 is allowed to escape by way of the pipe 27 up through the hollow stem 35 and out the exhaust port 45 to the atmosphere.

When the air is relieved from the piston, the piston will be moved to the left as above described by the tree returning to its original position and against the further pressure of the shaker. This will again operate the two-way pilot valve 28 admitting air into the cylinder 12, pushing the tree away from the tractor. There is always a continuous pressure by the tractor and the shaker unit against the tree, giving the tree a shake instead of a knock, which is common in tree shaking devices of today.

The valve operating arm 29 is made from a resilient material so that the overrunning of the valve rod 23 in either direction will not injure the mechanism. The arm 29 only momentarily contacts the push button 30 of the pilot valve 28, but is of sufficient duration to fill the cylinder 33 of the main valve with air before closing, thereby holding the valve 37 open until the air pressure is released from above the piston 34 of the main valve.

When the pusher head 20 is removed from the tree, the shaking operation ceases within the shaker head until the pusher bar 20 is pushed towards the tractor or the head in the next contact with a tree, therefore the shaker is automatic in its operation.

The valves 28 and 43 are mounted to the frame 15 so that they can be adjusted in relation to the valve operating arm 29, best illustrated in Figure 4, by way of the slots 46 formed in the bracket arms 47 of the valves. The shock absorbers 40 and 41 are exchanged for absorbers of different thickness for the governing of the stroke of the shaker. By increasing or decreasing the air pressure within the reservoir 8, the shaking effect can be more or less vigorous, depending upon the type of tree being shaken.

Referring to Figure 3, I have illustrated a shaker that shakes the tree by a pulling action, the piston rod 18 is eliminated and a tongue 48 is formed on the cylinder 12 and is adapted to enter the draw bar 49 of the tractor and secured thereto by the king pin 50. The valve operating rod 23 is extended through the end of the frame 15, terminating in an eye 51 to which the choker or cable 52 is secured after embracing the tree 53.

As the reservoir 8 is eliminated, in this modification, air under pressure is supplied directly to the valves by way of the hose line 10 and coupling 54. In this case the mechanism remains the same, the only difference residing in the relative opposite disposition of the cylinder 12 and frame 15 with respect to their support and the tree.

What I claim is:

1. A hydraulic motor for a tree shaker comprising a cylinder, a piston reciprocable in said cylinder, a piston rod connected to one side of said piston and extending outwardly of one end of said cylinder, engaging means carried by the outer end of said piston rod outwardly of said cylinder for engagement with and reaction to a resilient member, and means for alternately driving said piston in one direction and permitting movement of said piston in the opposite direction by the reaction of the engaged resilient member, said means comprising a valve operating rod connected to the opposite side of said piston in diametric relation to said piston rod, and extending outwardly of said cylinder, a fluid supply reservoir, a main valve, means connecting said reservoir to said main valve and means connecting said main valve to said cylinder for supplying fluid under pressure into said cylinder to operate said piston, said main valve including a valve member that is spring biased to closed position, a second piston in said main valve mounted for movement relative to said valve member and engageable therewith to move said valve member against the biasing spring to unseat said valve member, a pair of spaced control elements, means for connecting said control elements to said main valve in operational relation to said second piston for moving said second piston in opposite directions to open and close said valve member, means for connecting one of said control elements to said reservoir, an arm mounted on said valve operating rod intermediate of said control elements so that upon movement of said valve operating rod by said piston said arm will alternately engage said control elements to operate said main valve to effect reversal of the stroke of said piston.

2. A hydraulic motor as in claim 1 wherein said control elements each have a valve that is spring biased to closed position and are operatively opened by the engagement of said arm for respectively supplying and exhausting fluid for actuating said second piston.

References Cited in the file of this patent
UNITED STATES PATENTS

| | | |
|---|---|---|
| 1,626,068 | Bartlett | Apr. 26, 1927 |
| 1,998,873 | Kingsbury | Apr. 23, 1935 |
| 2,013,665 | Messier | Sept. 10, 1935 |
| 2,030,052 | Bernitz, Sr. | Feb. 11, 1936 |
| 2,030,986 | Havill | Feb. 18, 1936 |
| 2,081,248 | Murphy | May 25, 1937 |
| 2,159,311 | Berger | May 23, 1939 |
| 2,332,561 | Drott | Oct. 26, 1943 |
| 2,341,463 | Maytham, Jr. | Feb. 8, 1944 |
| 2,388,662 | Anderson et al. | Nov. 13, 1945 |
| 2,567,872 | Burke | Sept. 11, 1951 |
| 2,568,450 | Hjarpe | Sept. 18, 1951 |